(12) United States Patent
Chandler et al.

(10) Patent No.: US 7,419,203 B2
(45) Date of Patent: Sep. 2, 2008

(54) WATER-RESISTANT STORAGE SYSTEM FOR PICKUP TRUCKS AND UTILITY VEHICLES

(75) Inventors: Alan Chandler, Sedro Woolley, WA (US); James T. Rankin, Bellingham, WA (US); Shelli M. Kolakowski, Sedro Woolley, WA (US)

(73) Assignee: Armadillo Truckvault, Inc., Sedro Woolley, WA (US)

( * ) Notice: Subject to any disclaimer, the term of this patent is extended or adjusted under 35 U.S.C. 154(b) by 220 days.

(21) Appl. No.: 11/332,191

(22) Filed: Jan. 12, 2006

(65) Prior Publication Data

US 2007/0158968 A1    Jul. 12, 2007

(51) Int. Cl.
*B60J 7/00* (2006.01)

(52) U.S. Cl. .................. 296/37.6; 296/26.09
(58) Field of Classification Search ............. 296/26.09, 296/37.6, 26.08; 312/330.1; 224/404
See application file for complete search history.

(56) References Cited

U.S. PATENT DOCUMENTS

| 4,733,898 A | * | 3/1988 | Williams | 296/24.32 |
| 5,996,868 A | * | 12/1999 | Paradis | 224/404 |
| 7,083,219 B1 | * | 8/2006 | Gregory | 296/100.12 |

* cited by examiner

*Primary Examiner*—Joseph D Pape
(74) *Attorney, Agent, or Firm*—Jensen & Puntigam, P.S.

(57) ABSTRACT

The storage system includes a housing which is fittable into a bed of a pickup truck or utility vehicle, wherein the top member of the housing extends forwardly beyond the bottom member. Two pullout drawers are arranged side-by-side within the housing and extend so that a front surface thereof is substantially flush with the forward edge of the top member. The exposed surfaces of the housing have a protective polyurethane coating, providing protection against extreme weather. Connecting members extend from the sides of the housing to the sides of the pickup truck bed or utility vehicle.

6 Claims, 4 Drawing Sheets

WATER-RESISTANT STORAGE SYSTEM FOR PICKUP TRUCKS AND UTILITY VEHICLES

TECHNICAL FIELD

This invention relates generally to storage units for vehicles, and more specifically to such storage units which are fitted to the rear beds of pickup trucks and utility vehicles.

BACKGROUND OF THE INVENTION

Storage units for use with vehicles such as pickup trucks, usually including a housing and drawers, are well known generally, but have not heretofore been designed to be protected against extreme weather conditions, particularly heavy rainfall. Moisture thus can get into these conventional storage units during severe weather. This is particularly true when the storage unit is directly exposed to the weather, such as in a bed of the pickup truck. Also, such storage units are often designed such that they are unable to support much weight without damage to the storage units, which can be a disadvantage, particularly when there is a desire to haul small motorized vehicles, such as a motorcycle, or other heavy objects, such as construction equipment and supplies.

Hence, there is a need for storage units which can be conveniently positioned in a pickup truck or other utility vehicle, and provide a good, flexible storage capability, but also have a structure which is protective against extreme weather conditions, and further is strong enough to reliably and safely support items such as off-road motorcycles and the like, including various heavy equipment items and supplies, on top of the storage unit in the pickup truck.

SUMMARY OF THE INVENTION

Accordingly, the present invention is a storage unit adapted to fit the bed of a pickup truck or utility vehicle, comprising: a housing structure having a width and length such that it can be fitted into the bed of a pickup truck or utility vehicle, wherein the height of the housing is such that it is below the top edge of the sides of a pickup truck, and wherein the housing has a top member which extends forwardly of the bottom member, i.e. rearwardly of the vehicle, thereby providing an overhang relative to the bottom member; two side-by-side pullout drawers, fitted within the housing and arranged so that the drawers fit substantially flush with the interior of the sides and top member and against the front edge of the bottom member, so as to prevent entry of water into the storage unit, wherein the exterior of at least a front portion of the housing is coated with a protective coating, providing protection against weather; and connecting member assemblies which extend from the sides of the housing to the interior sides of the pickup truck or utility vehicle.

BEST MODE FOR CARRYING OUT THE INVENTION

Figure 1:
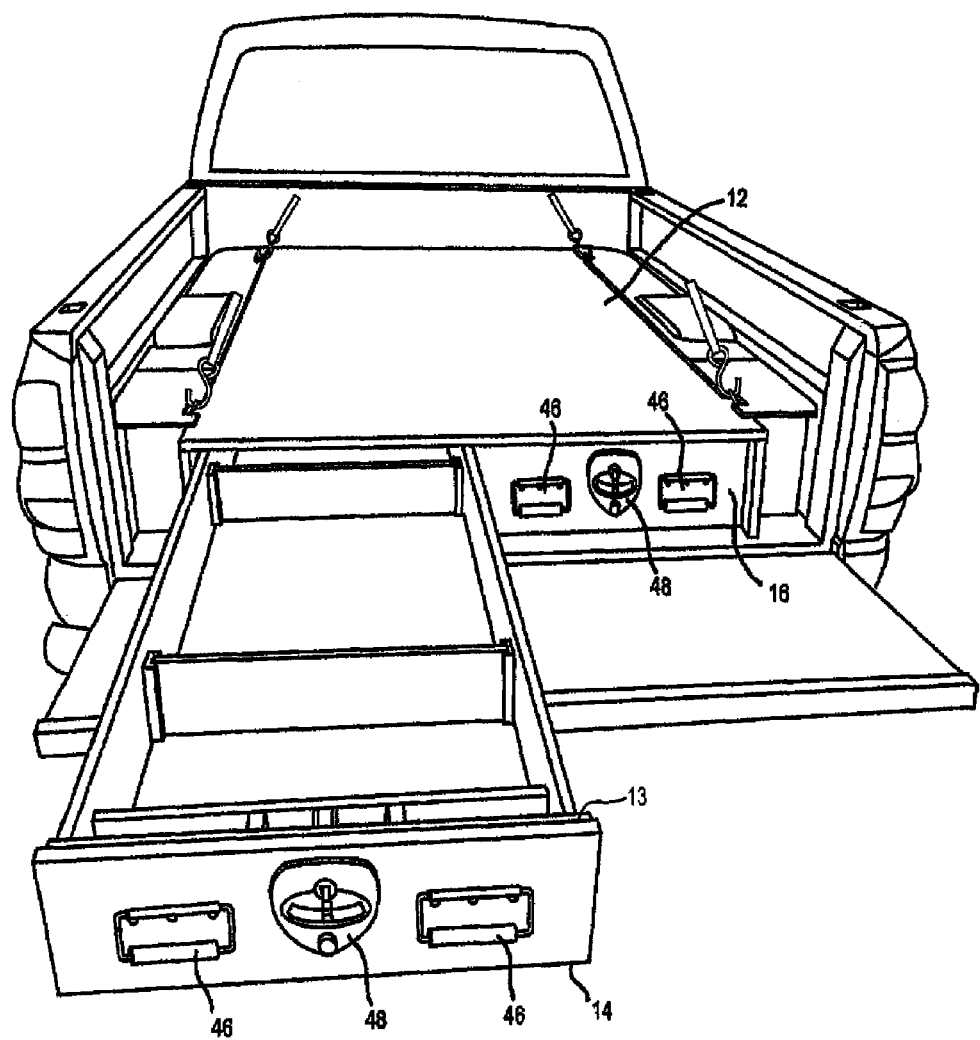
FIG. 1 is a perspective view showing the storage unit disclosed herein in position in a pickup truck, with one of two drawers in a partially opened position.
Figure 2:
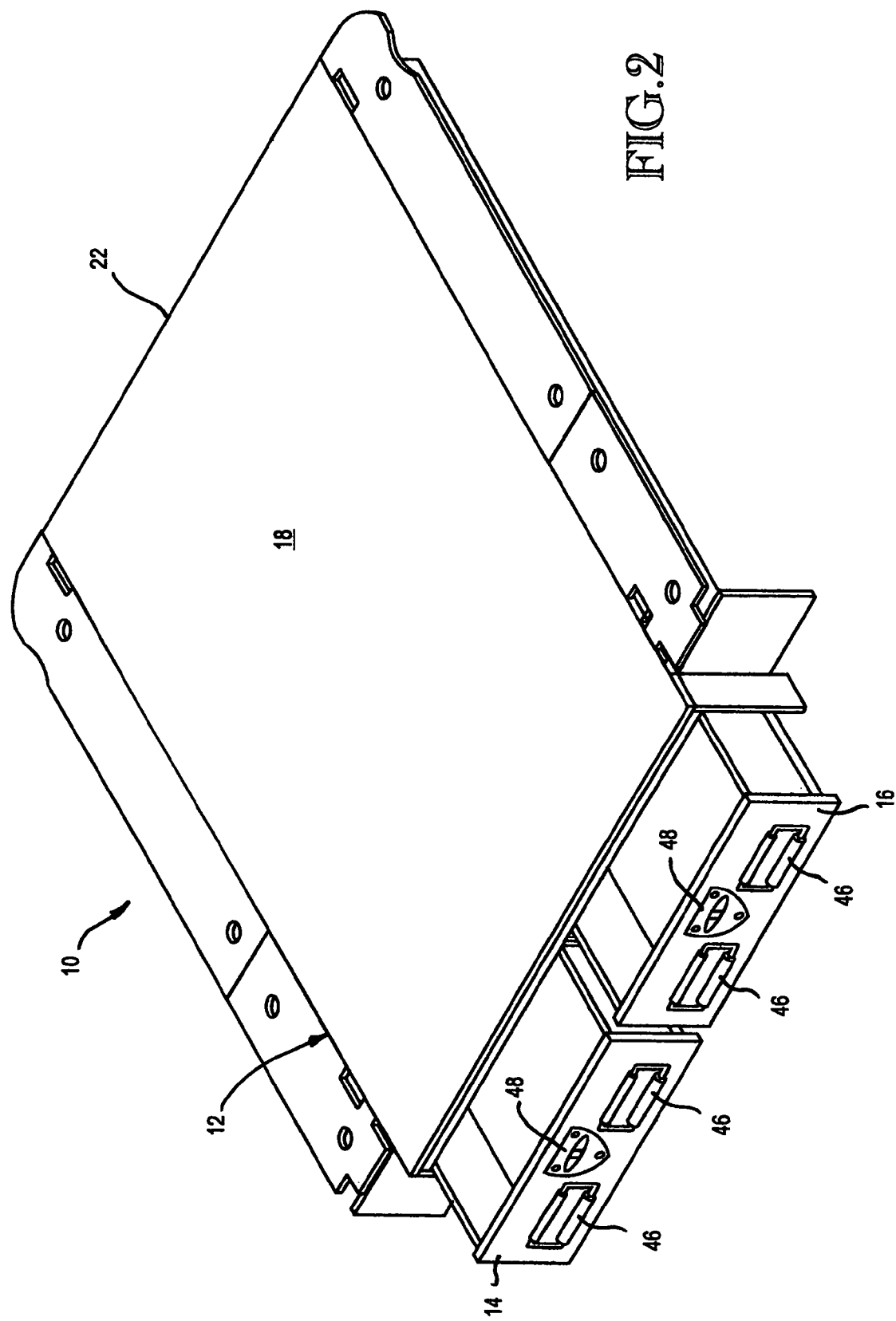
FIG. 2 is an isometric view showing an assembled storage unit apart from the vehicle, with the two drawers partially opened.

Referring now to FIGS. 1-4, a storage unit 10 includes a housing 12 and two slidable drawers 14 and 16, which are arranged side-by-side in the housing. In the embodiment shown, the housing 12 includes a top panel member 18, a bottom panel member 20, a rear panel member 22 and two side panel members 24 and 26. The housing in the embodiment shown is approximately 8-½ inches high and approximately 48 inches wide, although these dimensions can be varied. The top member 18 is 60-96 inches long, while the bottom member 20 is 58-94 inches long. These dimensions can vary further to some extent. The front of the top member extends forwardly past the front edge of the bottom member, i.e. it overhangs the bottom member by approximately 2 inches. This is significant, as it aids in the protection of the unit against extreme weather conditions.

Figure 4:
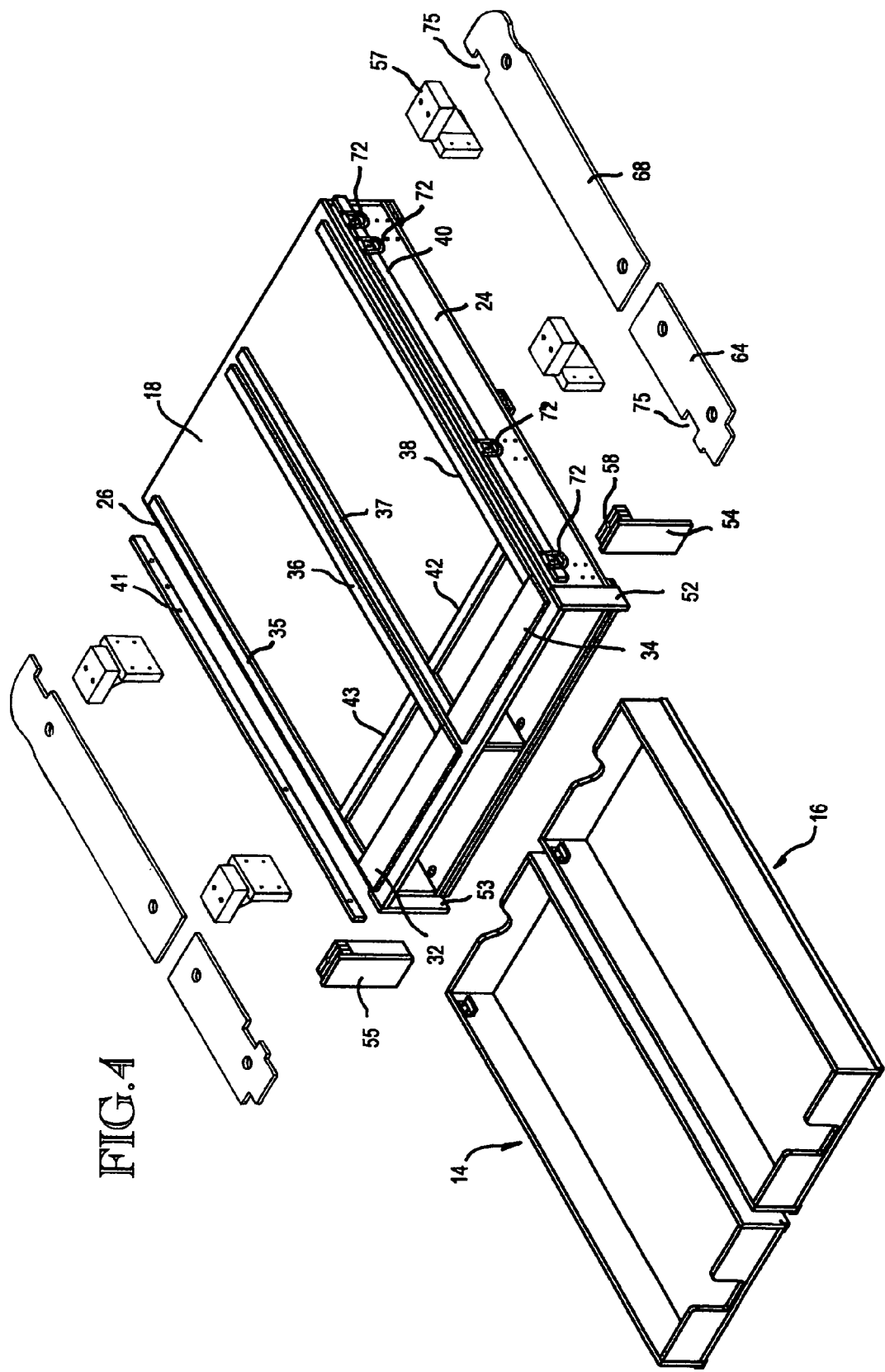
FIG. 4 is a more detailed exploded view of the storage unit of FIG. 2.

The housing 12 further includes a plurality of internal braces which add to the overall strength and integrity of the housing unit, as shown most clearly in FIG. 4. These include side-by-side forward braces 32 and 34, which are positioned at the forward edge of the top member, secured to the interior surface thereof. Longitudinal bracing members 35-38 extend the full length of the top member, with two bracing members along the two longitudinal edges thereof and two members close to the midpoint thereof, respectively. Bracing members 40, 41 are secured to the outer surfaces of side panel members 24 and 26, near the top edge thereof, and extend almost the full length of the side members. Bracing members 42, 43 are secured to the top member and extend, respectively, between each pair, of longitudinal bracing members 35, 36 and 37, 38, a small distance from the front edge thereof.

The bracing members add to the overall strength of the storage unit and permit relatively heavy articles such as, for instance, a motorcycle or heavy equipment or supplies to be carried on the top of the storage unit in the pickup truck, without damage to the unit. The various panel members and the bracing members comprising the housing are made from composite wood or heavy duty plastic composite in the embodiment shown.

The two drawers 14 and 16 each have a bottom panel member, two side panel members, and front and rear panel members, and are configured to fit conveniently and snugly into the front opening in housing 12. The edges of the front of the drawers mate with the interior edges of the housing and have a rubber bulb seal member 13 which extends therearound to ensure protection against moisture. The drawers each include two heavy-duty pulls 46 and 46 and an all-weather lock 48. The drawer pulls and the all-weather lock are secured to the front panel of the drawers in such a maimer as to prevent entry of moisture into the drawer, even under extreme weather conditions. The bulb seal 13 extends around the rear surface of the front panel, at the periphery thereof.

The front panel members of the drawers are ¾-inch plastic. The rest of the storage unit has a polyurethane protective coating, up to ¼-inch thick, to protect against rusting of the drawers and other harsh weather conditions, and also acts to protect the unit. Likewise, the exposed portions of housing 12 have a similar protective coating, particularly around the front portions thereof. The protective coating is, as indicated above, a formulation which provides protection against the weather, particularly entry of moisture into the storage units and prevention against rust.

Figure 3:
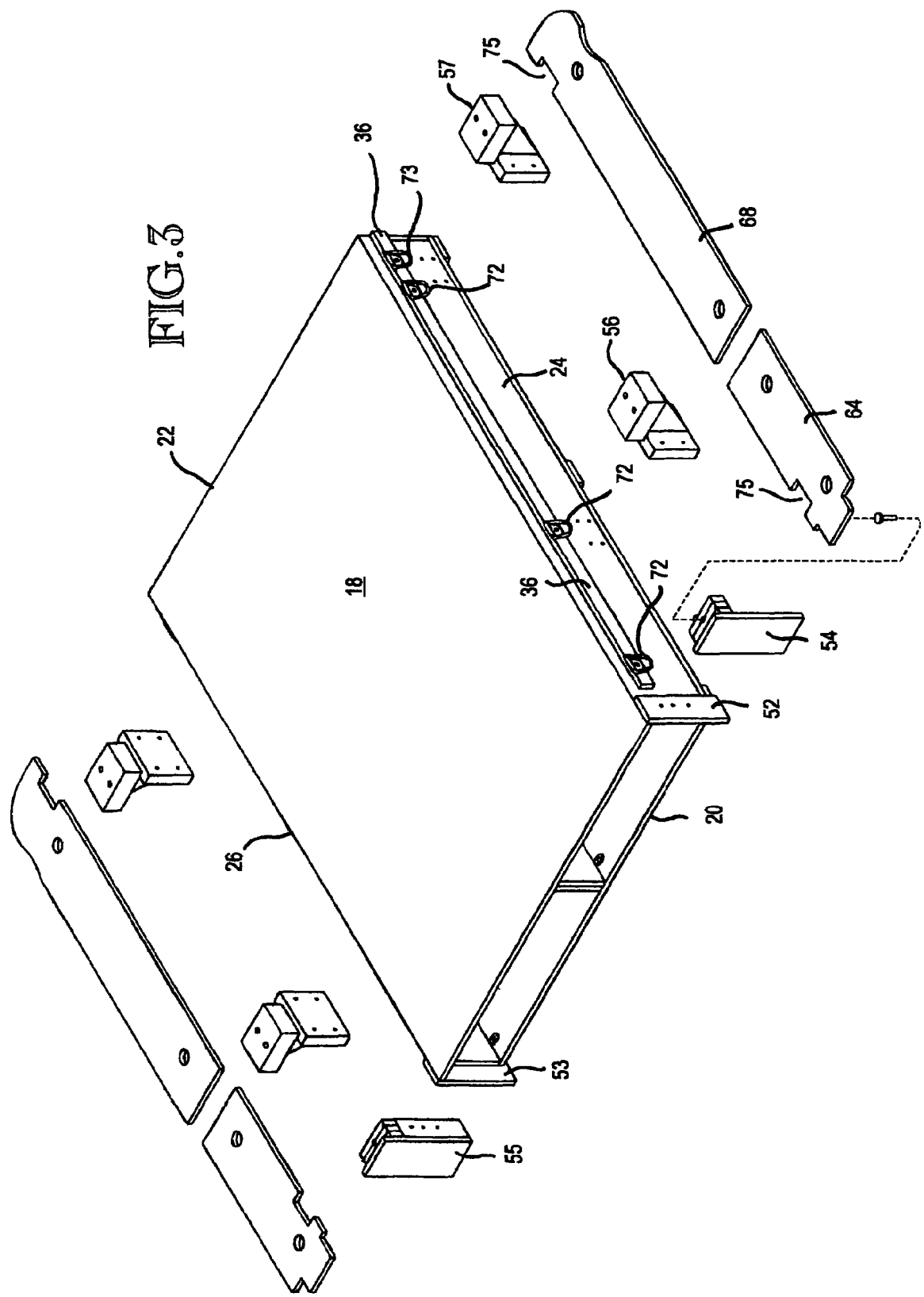
FIG. 3 is an exploded view of the storage unit of FIG. 2.

Referring now to FIGS. 3 and 4, secured to the side panel members of housing 12 are two side faceplate elements 52, 53. The side faceplate elements extend for the full height of the sides, and are co-planar with the front edge of the top member; thus, they extend a small distance forwardly of the bottom panel member and the front edge of the side panel members. The top member 18 and side faceplates 52, 53 thus define the overhang relative to the bottom member 20, as shown most clearly in FIG. 3.

Attached to side faceplates 52, 53, respectively, by screws or the like, are two support faceplates 54, 55. Each support faceplate extends for the full height of side faceplates 52, 53 and extends outwardly from side faceplates 54, 55, approximately 4-¾ inches, as shown in FIG. 3. Attached to each side panel member are two to three support gussets; shown in FIG. 3 are a middle support gusset 56 and a rear support gusset 57. A third support gusset may be used, depending on the length of the storage unit. The support gussets are attached by screws or other attachment members. Positioned between the support gussets and the side members are rubber and stainless steel washers (not shown).

Along each side, in the embodiment shown, a small horizontal support portion 58 is attached to, or part of, the support faceplates 54 and 55, and a similar support portion is attached to, or part of, middle support gusset 56, providing support to a forward cover member 64. Each forward cover member 64, in the embodiment shown, is approximately 22 inches long and 7 inches wide. The width of the forward cover members, however, will vary as they extend from the side panel members to the interior sides of the truck bed. The length of the forward cover members may also vary. The forward cover members 64, respectively, are secured to the support portions 58 on support faceplates 54 and 55 and middle support gussets 56 by plastic locking pins. The tops of the pins are recessed into the cover members and then are covered by the protective coating. The pins extend through the cover members into openings in the support portions. Openings 80-80 are provided on the cover members to permit a user to work with (insert and remove) the cover members with their fingers. Secured to the middle support gussets 56 and rear support gussets 58 on both sides of the housing are rear cover members 68. In the embodiment shown, rear cover members 68 are approximately 41-¾ inches long by 7-½ inches wide, although the width can also vary to fit between the sides of the housing and the interior sides of the truck bed, and the length can vary depending on the length of the truck bed.

Attached to the exposed surfaces of longitudinal bracing members 36-36 are turnbuckle elements 72-72. The turnbuckle elements can extend upwardly through openings 75-75 in the lid and wing members. The turnbuckle elements 72 permit attachment of tie-down members and straps (FIG. 1) to secure motorcycles and other articles to the top of the storage unit.

Hence, a new storage unit particularly adapted for pickup trucks and utility vehicles has been disclosed. The arrangement provides protection for the contents of the storage unit in extreme weather conditions.

Although a preferred embodiment of the invention has been disclosed here for purposes of illustration, it should be understood that various changes, modifications and substitutions may be incorporated in the embodiment without departing from the spirit of the invention, which is defined by the claims which follow.

What is claimed is:

1. A storage unit adapted to fit the bed of a pickup truck or utility vehicle, comprising:
   a housing structure having a width and length such that it can be fitted into the bed of a pickup truck or utility vehicle, the housing structure having a top member, a bottom member and side members, wherein the height of the housing is such that it is below the top edge of the sides of a pickup truck, and wherein the top member extends beyond a front edge of the bottom member, thereby providing an overhang relative to the bottom member;
   two side-by-side pullout drawers, fitted within the housing and arranged so that the drawers fit substantially flush with the interior of the side members and top member and against the front edge of the bottom member, so as to prevent entry of water into the storage unit, wherein the exterior of at least a front portion of the housing is coated with a protective coating, providing protection against weather; and
   connecting member assemblies which extend from the sides of the housing to the interior sides of the pickup truck or utility vehicle.

2. The storage unit of claim 1, including a rubber seal on the drawers which provides a moisture seal between the drawers and the housing.

3. The storage unit of claim 1, wherein the top member of the housing has bracing elements secured thereto, to provide a weight-bearing capability sufficient to support articles, including a motorcycle or other members.

4. The storage unit of claim 1, wherein the connecting member assemblies include a plurality of support elements which extend from each side member of the housing, and two longitudinally adjacent cover members which are removably secured to the support elements, the cover members extending from the side of the housing to the sides of the pickup truck or utility vehicle.

5. The storage unit of claim 1, including at least two turnbuckle elements secured to the side members of the housing, arranged for attachment of tie-down members thereto for securing vehicles or other members to the top of the storage unit.

6. The storage unit of claim 1, including first and second faceplate elements which are secured, respectively, to the side members of the housing, wherein the first and second faceplate elements have front edges which are coplanar with the front edge of the top member, and further including first and second faceplate assemblies, the first and second faceplate assemblies being secured, respectively, to the first and second faceplate elements, and extending between the first and second faceplate elements and the interior edge of the pickup truck bed or utility vehicle.

* * * * *